US00RE35179E

United States Patent [19]

Klus

[11] E Patent Number: Re. 35,179

[45] Reissued Date of Patent: Mar. 19, 1996

[54] ENGINE AIR INTAKE VORTEX PLATE

[76] Inventor: Kenneth F. Klus, 34191 Camino Capistrano, Capistrano Beach, Calif. 92624

[21] Appl. No.: 31,750

[22] Filed: Dec. 5, 1994

Related U.S. Patent Documents

Reissue of:

[64] Patent No.: D. 332,612
Issued: Jan. 19, 1993
Appl. No.: 836,608
Filed: Feb. 18, 1992

U.S. Applications:

[63] Continuation of Ser. No. 637,763, Jan. 4, 1991, abandoned, which is a continuation of Ser. No. 240,568, Sep. 6, 1988, abandoned. 6]

[52] U.S. Cl. ..... D15/5

[58] Field of Search ..... 15/5; 123/522, 123/523, 527; 48/18.01; 261/50.1

[56] References Cited

U.S. PATENT DOCUMENTS

| | | | |
|---|---|---|---|
| 3,935,290 | 1/1976 | Dickensheets et al. | 261/50.1 |
| 4,088,104 | 5/1978 | Ibbott | 123/590 |
| 4,333,441 | 6/1982 | Still et al. | 123/590 |
| 4,409,951 | 10/1983 | Whitworthl | 123/590 |
| 4,872,440 | 10/1989 | Green | 123/527 |

*Primary Examiner*—Doris V. Coles
*Attorney, Agent, or Firm*—Stetina Brunda & Buyan

[57] CLAIM

The ornamental design for an engine air intake vortex plate, as shown and described.

DESCRIPTION

FIG. 1 is a top perspective view of an engine air intake vortex plate, showing my new design;
FIG. 2 is a bottom perspective view thereof;
FIG. 3 is a side elevational view, the opposite side being a mirror image thereof;
FIG. 4 is a top plan view thereof; and,
FIG. 5 is a bottom plan view thereof.

Figure 1:
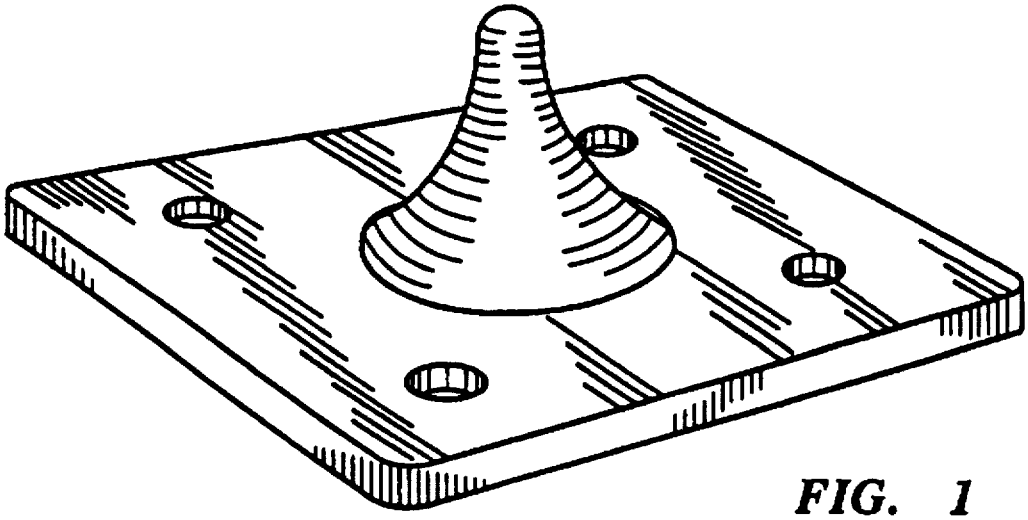
Figure 2:
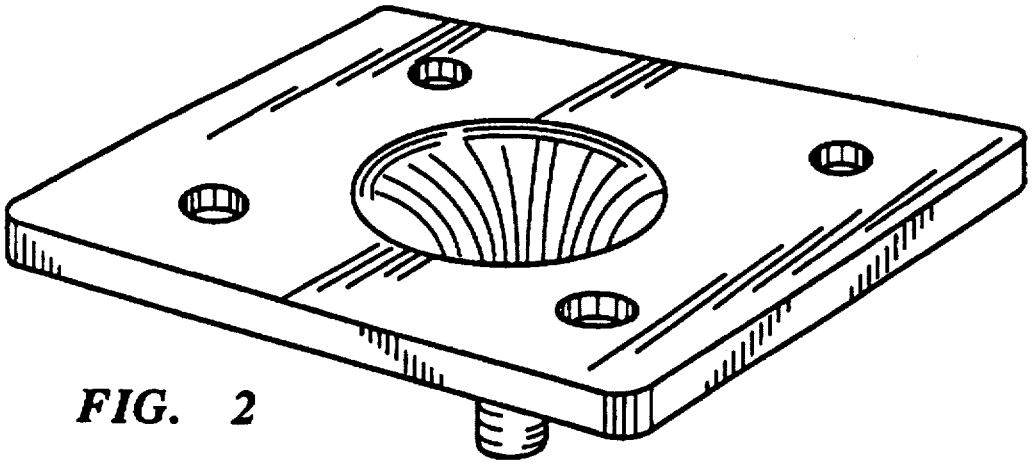
Figure 3:
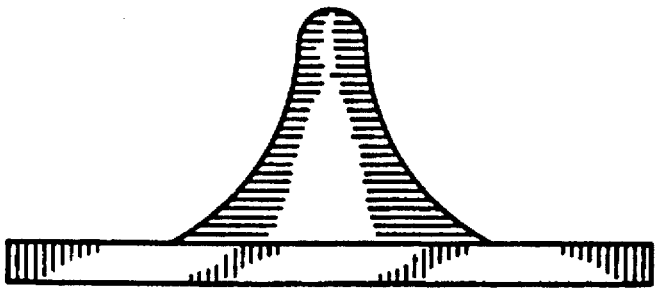
Figure 4:
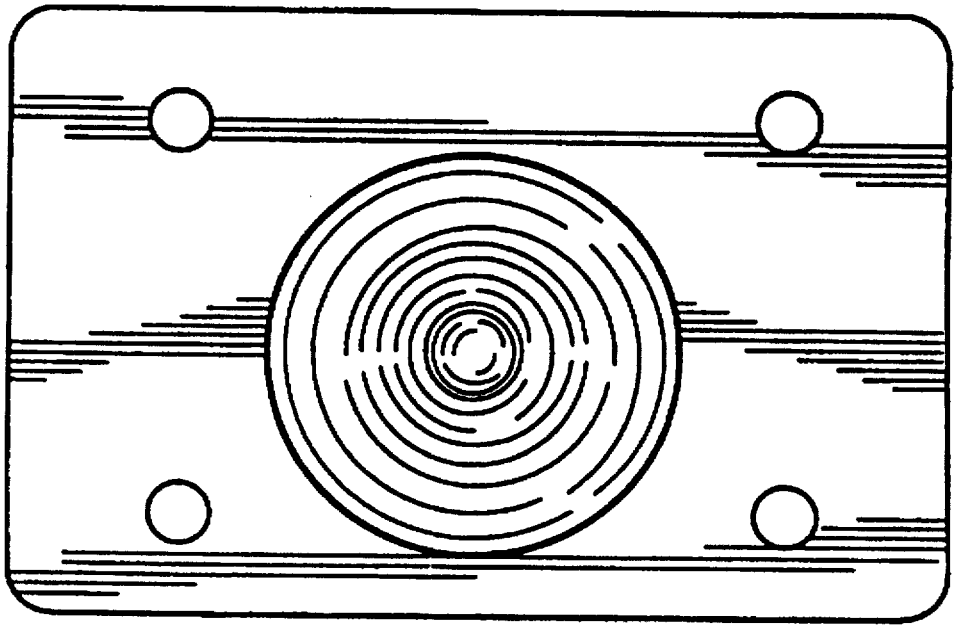
Figure 5:
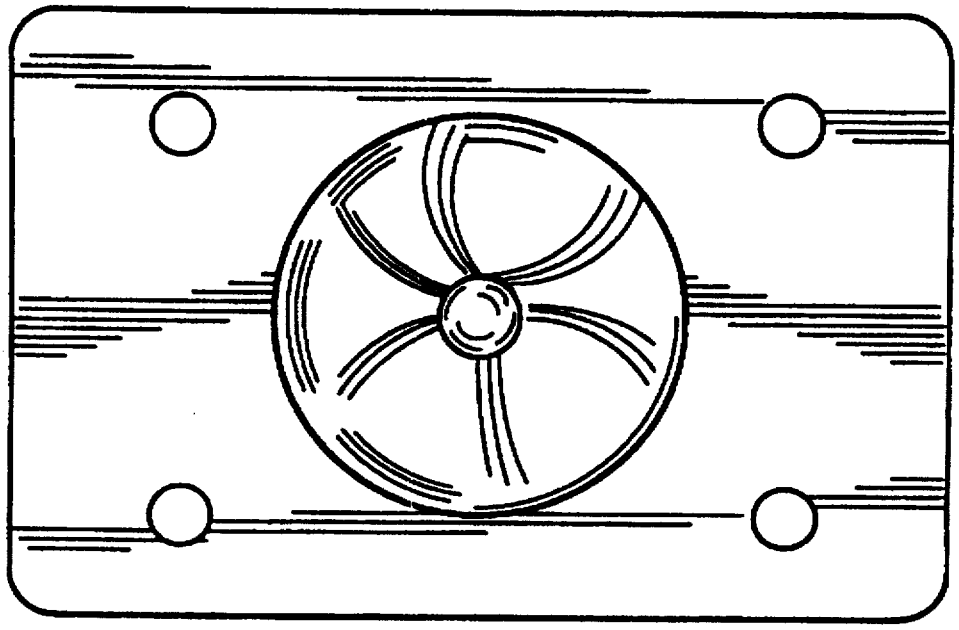

1 Claim, 2 Drawing Sheets